United States Patent
Rayor et al.

(10) Patent No.: US 9,002,663 B2
(45) Date of Patent: Apr. 7, 2015

(54) METHOD AND APPARATUS FOR SENSING DRAG OF A FISHING LINE

(76) Inventors: Mark Rayor, Torrance, CA (US); William O'Banion, Anaheim, CA (US)

( * ) Notice: Subject to any disclaimer, the term of this patent is extended or adjusted under 35 U.S.C. 154(b) by 350 days.

(21) Appl. No.: 13/035,836

(22) Filed: Feb. 25, 2011

(65) Prior Publication Data

US 2011/0213570 A1    Sep. 1, 2011

Related U.S. Application Data

(60) Provisional application No. 61/308,934, filed on Feb. 27, 2010.

(51) Int. Cl.
*G01F 1/00*     (2006.01)
*A01K 87/00*    (2006.01)
*A01K 97/00*    (2006.01)

(52) U.S. Cl.
CPC ............... *A01K 87/007* (2013.01); *A01K 97/00* (2013.01)

(58) Field of Classification Search
USPC .................................................. 43/17; 702/42
See application file for complete search history.

(56) References Cited

U.S. PATENT DOCUMENTS

| | | | | |
|---|---|---|---|---|
| 4,051,616 | A | * | 10/1977 | Mathauser ......................... 43/17 |
| 5,259,252 | A | | 11/1993 | Kruse et al. |
| 5,699,159 | A | * | 12/1997 | Mason .......................... 356/491 |
| 7,318,295 | B2 | | 1/2008 | Pekin |
| 7,322,253 | B2 | * | 1/2008 | Owens ...................... 73/862.391 |
| 2008/0000138 | A1 | * | 1/2008 | Cummings ................ 43/18.1 R |
| 2010/0000143 | A1 | * | 1/2010 | Pekin ............................... 43/17 |

* cited by examiner

*Primary Examiner* — Tung S Lau
*Assistant Examiner* — Xiuquin Sun
(74) *Attorney, Agent, or Firm* — Kyle W. Rost

(57) ABSTRACT

An electronic sensor employs a strain gauge controlled by a microprocessor on a circuit board. The processor operates software to measure electric impulses from the strain gauge and to convert them into digitally recognizable numbers. Software provides for calibration of the electronic sensor specific fishing rods. The software also controls an LCD read-out device to allow the user to preset a known drag resistance force in suitable units of measure on the fishing reel and to continually read out the amount of force pressure on the fishing line after hook-up so that a user can apply maximum pressure on a fish while fighting the fish without breaking the fishing line.

4 Claims, 2 Drawing Sheets

METHOD AND APPARATUS FOR SENSING DRAG OF A FISHING LINE

CROSS-REFERENCE TO RELATED APPLICATION

This application claims the benefit of U.S. Provisional Patent Application Ser. No. 61/308,934 filed Feb. 27, 2010, copending.

BACKGROUND OF THE INVENTION

1. Field of the invention

The invention generally relates to fishing and in particular to signal devices.

2. Description of Related Art Including Information Disclosed Under 37 CFR 1.97 and 1.98

Fishing reels often have a built in drag system that can be adjusted or calibrated by the angler by means of a knob or lever. This allows the angler to apply more or less resistance pressure on the fishing line before the fishing line unspools from the fishing reel. The main reason for this drag system is to prevent the fishing line from breaking when more pressure is applied on the fishing line than the fishing line can withstand. When a fish is on the end of the fishing line and exerts more pressure than the fishing line can withstand, the fishing line would part and the fish would be lost if it were not for the drag system on the fishing reel allowing the fishing line to unspool, as necessary, off of the fishing reel with less pressure than the breaking point of the fishing line.

One problem for a fisherman is that common fishing reels have no mechanism to measure and report the fishing reel drag setting. Typically the drag setting will be adjusted with consideration for the test strength of the line. Currently it is adjusted by feel. Through the years many improvements have been made to fishing reels by fishing reel manufacturers including materials used to build fishing reels. No improvements have been made or added to fishing reels over many years with regards to setting the fishing reel drag. Most anglers set the fishing reel drag by feel, the same way it has been done for decades.

Because fishing equipment is used in a harsh marine environment, corrosion and deterioration to a fishing reel and fishing rod components from salt and outdoor elements have always been a problem. Mechanical equipment or equipment relying upon moving parts is prone to failure due to contact with salt water, dirt, and contaminants. The records of the United States Patent Office show several devices and methods of mechanically measuring drag. These devices have required moving parts and mechanical elements. They share a likelihood of failure or loss of calibration when used in a marine setting.

U.S. Pat. No. 7,318,295 to Pekin shows a fishing rod with integrated line tension measurement system and readout in selected units of force, such as pounds. The reel mount on the Pekin rod is arranged to slide linearly on a seat portion of the rod. The reel mount is located on a splined portion of the rod in front of the handle. The splines prevent the reel mount from twisting on the rod. The fishing line pulls both the reel and the reel mount forward, against a pressure sensor that measures the forward force. The pressure sensor communicates the measurement to an electronic system with readout display. The fisherman is allowed to preset a threshold tension limit. If the threshold is reached, the electronic system actuates an audible alarm.

It would be desirable for a tension measurement system to have no moving parts to maintain. The Pekin device is illustrated as being sandwiched on the fishing rod at the fishing rod butt. This positioning makes disassembly of the tubular spline impossible for cleaning, lubrication, inspection and maintenance. Without the ability to disassemble clean and lubricate moving parts, the Pekin device can be expected to fail after being exposed to a marine environment.

More generally, it would be desirable for a drag sensor to not require the presence of a reel seat. Not every rod has a predefined a reel seat. A fishing rod without a fishing reel seat allows the fisherman to mount the fishing reel in the location of choice on the fishing rod. The advantage of this option is a fishing reel can be mounted in a location most comfortable for the fisherman. A tall person with long arms sometimes is not comfortable with a fishing reel mounted in the same location on the fishing rod as a small person with short arms. It would be desirable to have a drag sensor that can be mounted to any fishing rod, with or without a reel seat.

A common problem for many fishermen is to achieve proper fishing technique. Particularly in deep sea fishing, the battle with a large fish can extend for a long time. A novice fisherman frequently desires to hold the rod quite high, perhaps to protect his own back against fatigue during the lengthy battle to land the fish. Skilled fishermen believe that a high rod position is not desirable, on the basis that the fish is subjected to less than a desired amount of force or pressure from the rod. However, convincing the student fisherman to employ a more effective rod angle has proven to be difficult, because the novice is not convinced that another angle is better.

It would also be desirable to have the capability to show a novice fisherman how much force or pressure he is applying against a fish during a lengthy battle. A suitable device showing tension on a rod during the battle can guide the fisherman to hold the rod in an effective position to tire the fish.

A common fishing reel is equipped with two methods for mounting to a common fishing rod. One method is a mounting foot with two ears. The foot with ears on the fishing reel is in a location centered under the fishing reel with the two ears opposing each other with one ear facing toward the tip and the other ear toward the bottom of the butt of a fishing rod in linear alignment. A common fishing reel seat will accommodate the fishing reel foot with ears and by securing them by two rings on the fishing reel seat. The rings can slide over the ears to a snug position and firmly secure the fishing reel.

The other method common to fishing reels is by means of a clamp. There are two bolts centered under the fishing reel and extending downward, spaced to receive the fishing rod between them. A clamp is bridged between the two bolts to sandwich the fishing rod between the clamp and the reel. The clamp is firmly secured to the rod by placing and tightening nuts on the two bolts. This method does not require a fishing reel seat. The fishing reel can be secured to the fishing rod by clamping it at a desired location along the length of the rod.

Where a sensor relies upon movement along a spline or slide, it is important for the sliding motion to be free. Thus, the position of a sensor with respect to a fishing rod can influence its accuracy. A sliding sensor relying on forward fishing line tension, where the fishing line is at an angle from the center of the spline or slide as found in Pekin, can lead to binding and give inaccurate measurement. Where a sensor must be positioned to communicate with a fishing line applying forward angular tension, it is desirable for the sensor to have no moving parts to bind or cause inaccurate reading.

A sensor placed where the fisherman will touch it will produce false readings. With the Pekin device, the fisherman has a hand on the fishing reel handle. Touching any part of the reel will change the tension being exerted and cause a false reading. It would be desirable for a sensor to be placed where the fisherman need not touch it while battling a fish, so that the sensor will always read accurately while sufficient tension is applied by the fishing line to cause the fishing rod to flex.

U.S. Pat. No. 5,259,252 to Kruse shows a transducer that determines force on a rod by responding to the deflection of the rod. With increased deflection, the circuitry increases a time period for counting signals. The greater the number of signals that are counted, the greater the force is reported on a display. The transducer must be mounted either inside the fishing rod or in a groove that must be formed on the underside of the rod.

It would be desirable to mount a sensing device on a fishing rod without adversely affecting the integrity, strength and performance of the fishing rod. Having to place a transducer inside a rod or having to form a groove in the rod to receive a transducer limits the application of the transducer. A further limitation on use arises in a scheme as taught by Kruse because complicated circuitry with many moving parts can lead to loss of performance in a harsh marine environment. The complexity of the circuitry also requires a skilled technician to perform calibration. As it is likely that the calibration will change when the device is in actual use in a marine environment, a more reliable and user friendly sensor system would be desirable.

U.S. Pat. No. 7,322,253 to Owens discloses a handgrip that attaches to a fishing rod and contains various sensors for detecting tension of the fishing line. The device has multimode ability, in one mode responding to lateral pull on the rod tip and in the second mode responding to axial pull on the fishing line.

It would be desirable for any tension measuring device to be independent of a handgrip on the rod. Employing the tension measurement device as a hand grip introduces limitations in how the fishing rod is handled. For example, the angler may prefer to hold the rod elsewhere, whether to aid handling the reel or to obtain leverage, but such variation in handling alters the functionality of the Owens device.

The handgrip adds the further disadvantage of employing moving parts to sense tension. Moving parts require cleaning, lubrication, and maintenance, which is a disadvantage in a marine environment. Moving parts can easily fail after being exposed to a fishing environment. The use of a handgrip to take measurements is likely to be inaccurate because the fisherman has a hand wrapped tightly around the handgrip. The hand will exert added pressure to the tension of the fishing line. Line tension will change due to the hand tension being exerted and cause a false reading. The angler is likely to introduce additional inaccuracy and perhaps cause binding due to expected human variation in hand placement.

It would be desirable for a tension measurement device to take into account the specific characteristics of the associated fishing rod. The Owens handgrip derives tension information without regard to the physical parameters of the rod itself. It would be an improvement for the sensing device to use the fishing rod to obtain information.

To set fishing reel drag by feel, the angler typically pulls on the fishing line with one hand while holding the rod and reel with the other until the line unspools off the fishing reel. In this fashion the fisherman can feel how much pressure it took to make the fishing line unspool off of the fishing reel. If the angler is not satisfied with the amount of resistance pressure, the fishing reel drag lever is adjusted higher or lower until the drag pressure feels right. A huge question is "What feels right?" An experienced angler has an idea from past experience but it is still a guess and it changes based on the line strength (test). An inexperienced angler has no idea and may be caught in a dilemma.

If the fishing reel drag is set too tight, a large fish may break the fishing line. If the fishing reel drag is set too loose, a large fish may just unspool all the fishing line off of the fishing reel and keep going. In either event the fish will be lost.

Common fishing line has a manufacturer's pound test rating. This rating indicates the maximum pressure in pounds of force that it will take to part the line. It is agreed by most experienced anglers that a fishing reel drag should be set at 25% of the fishing line pound test rating. For example, if a fishing reel has 40-pound test fishing line, then fishing reel drag should be set at 10 pounds of drag. When the drag of this example is set properly and more than 10 pounds of pressure is put on the fishing line, it should unspool from the fishing reel.

Another problem the angler encounters is that fishing reel drag pressure changes constantly and inadvertently when a fish is fought. What was right a few moments before may have changed due to unforeseen circumstances. The angler has no way of knowing if this has happened except for feel. A few of the many things that contribute to change in fishing reel drag are heat from fishing reel drag friction, moisture from the marine environment, change in diameter of the fishing reel arbor when fishing line is paid out, or that the angler accidentally has bumping the drag adjustment lever on the fishing reel in the heat of battle with a fish.

It would be desirable to have a means for guiding and assisting the angler in setting the fishing reel drag to a more accurate setting than just empirical feel, prior to deploying the fishing equipment.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a means for guiding and assisting the angler in setting the fishing reel drag to a more accurate setting than just empirical feel, prior to deploying the fishing equipment.

A further object is to provide a sensing device and method of operation that will (1) measure fishing line tension in real time; (2) digitally display the line tension on deployed fishing line in real time while fishing, utilizing electronic technology; (3) allow current drag line adjustment during read out phase; (4) have the capability to be permanently mounted to a fishing rod; (5) have the capability to be integrated into new fishing rod designs; or (6) be attached to existing fishing rods; (7) have no moving parts that require maintenance, and, (8) have the ability to be used on any fishing rod that has the ability to flex when tension is applied.

Another object is to provide a sensing device that operates in real time to advise the fisherman on the effectiveness of various rod positions during a battle to land a fish.

The invention satisfies these objects by providing a strain gauge to sense rod strain during a hook-up, and that electronically sends that data to a microprocessor. Typically the microprocessor is mounted on a circuit board carrying such additional components as needed, which may include a memory chip containing imbedded software. This assembly of components and operating software is effective to convert the data into a digital report that allows the angler to continually monitor the amount of tension that is on the fishing line in real time during a battle with a fish. It will permit the angler to adjust the fishing reel drag if it has changed from the desired setting when the fishing line is unspooling off of the fishing reel.

All common fishing rods are built to flex when pressure is applied by fishing line tension. The amount of flex will change based on the amount of pounds pressure applied by the fishing line tension and read out in accordance with an algorithm within the operating software. An electronics package, which includes a microprocessor on a circuit board, connected to a strain gauge attached to the rod, measures the rod's deflection, calculates the line tension and converts the line tension into digitally recognizable numbers.

In another aspect, software provides for calibration of the strain gauge and electronic package to specific fishing rods. The software also controls an LCD read-out device to allow the user to preset a known drag resistance force in suitable units of measure on the fishing reel and to continually read out the amount of force pressure on the fishing line after hook-up so that a user can apply maximum pressure on a fish while fighting the fish without breaking the fishing line.

According to the invention, apparatus for sensing drag of a fishing line is applied to a longitudinally elongated fishing rod having a reel with fishing line mounted thereon. When pulling force is applied to the fishing line out of alignment with the longitudinal dimension of the rod, the rod flexes. A strain gauge is bonded to the fishing rod such that the strain gauge senses the degree of flex of the fishing rod. The strain gauge generates an output signal indicative of the sensed degree of flex. A microprocessor is in communication with the strain gauge to receive an input signal responsive to the output signal from the strain gauge. The microprocessor processes the input signal to derive tension on the fishing line and to produce a corresponding readout signal of line tension in a selected unit of measurement. An output device communicates with the microprocessor to receive the readout signal and express a human perceptible indication of fishing line tension in the selected unit of measurement.

According to a method of determining utility fishing line tension, a specific, preselected fishing rod can be calibrated according to its own characteristics. A sensor device employs a strain gauge measuring flex of the fishing rod. A microprocessor in the sensor device receives and converts inputs of measured flex from the strain gauge into line tension and outputs line tension that has been converted into units of force. An output device receives the line tension outputs and expresses this line tension in humanly perceptible form. The sensor device is operated in calibration mode by programming the microprocessor to request benchmark values of line tension based on a target value. The microprocessor is programmed to receive and record inputs of rod flex associated with benchmark values of line tension. The microprocessor is also programmed to operate in utility mode by receiving an input of rod flex and by automatically outputting an associated line tension by derivation from the recorded benchmark values. The user establishes calibration mode and then inputs a target line drag to the microprocessor. The user receives a programmed request from the microprocessor for the fishing rod to be flexed to a first degree, producing an associated first benchmark line tension readout that is lower than the target line drag. The user flexes the preselected fishing rod to the first degree and inputs the first benchmark line tension readout and associated strain gauge output signal to the microprocessor. The user receives a programmed request from the microprocessor for the fishing rod to be flexed to a second degree, producing an associated second benchmark line tension readout higher than the target line drag. The user flexes the preselected fishing rod to the second degree and inputs the second benchmark line tension readout and associated strain gauge output signal to the microprocessor. The sensor device is operated in utility mode by flexing the preselected fishing rod to an unknown degree and receiving an associated value of line tension from the output device.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

Figure 1:
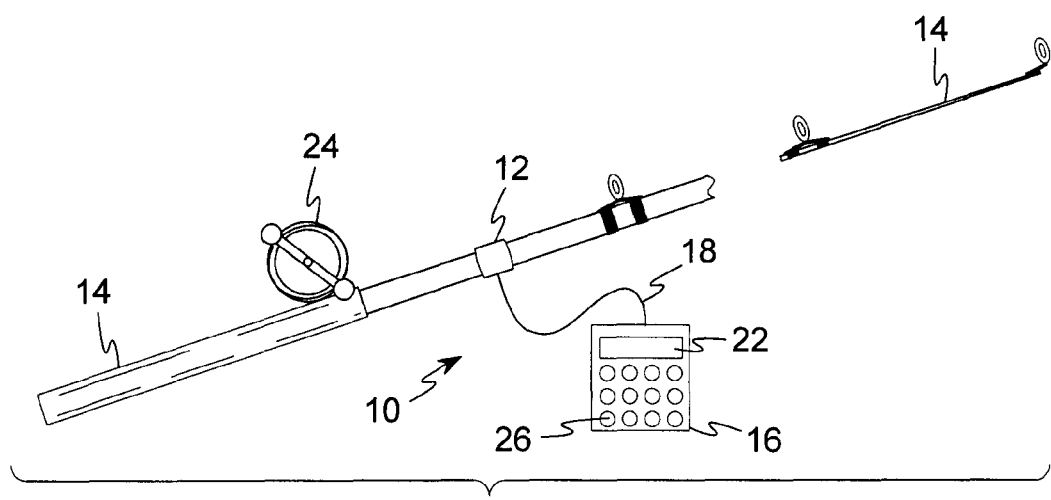
FIG. 1 is a fragmentary view of a fishing rod, broken away at the center, showing the mounted sensing device.

The invention is an apparatus and method for sensing drag of a fishing line. The apparatus is a sensing device 10 composed of four elements: a strain gauge 12, a signal conditioning circuit, a microprocessor, and an LCD Display, with the latter three elements referred to collectively as the electronics package 16. The electronics package 16 may further include other elements that may be needed, such a memory serving the microprocessor, or such other elements may be included within the architecture of the microprocessor. Several components of the sensing device 10 may be obtained from commercial sources. These include the strain gauge, utilizing known technology in a new application. The microprocessor is a commercially produced element that is mounted on a common circuit board carrying all necessary supporting elements, including a commercially produced LCD display. The strain gauge 12 is bonded to a fishing rod 14. The remaining elements, which together are shown as the electronics package 16, are mounted in a water proof case and connected to the strain gauge by a suitable means for transmitting signals, which may be a wire conduit 18.

Wireless communication 19 may be employed between the electronics package 16 and the strain sensor 12. A short-range system such as Bluetooth enables the electronics package to be mounted at any remote location near the fisherman but not necessarily on the rod 14. The electronics package 16 can be modified by the addition of a global positioning system chip, providing the ability to collect information of where and when a fish was hooked and where the battle ended. A timer can provide information on how long the battle lasted.

The strain gauge 12 is bonded with epoxy or glued to the base material of a bending beam, which in this case is the fishing rod 14. The attachment is by bonding in order to adapt the strain gauge to any fishing rod, while not requiring the structural integrity of the rod to be degraded. In addition, bonding to the rod has been found to produce reliable sensitivity in the performance of the strain gauge. The term, "bonding," refers to the use of glue, epoxy, silicone, or other agents causing the strain gauge to be functionally attached to the rod. Either the angler or a fishing equipment outfitter may attach the strain gauge to the fishing rod. The electronics package 16 will be placed in a remote location on the fishing rod, such as beyond the location where an angler would hold the fishing rod while fighting a fish so as not to interfere with the fishing line 20 or the fisherman.

Figure 2:
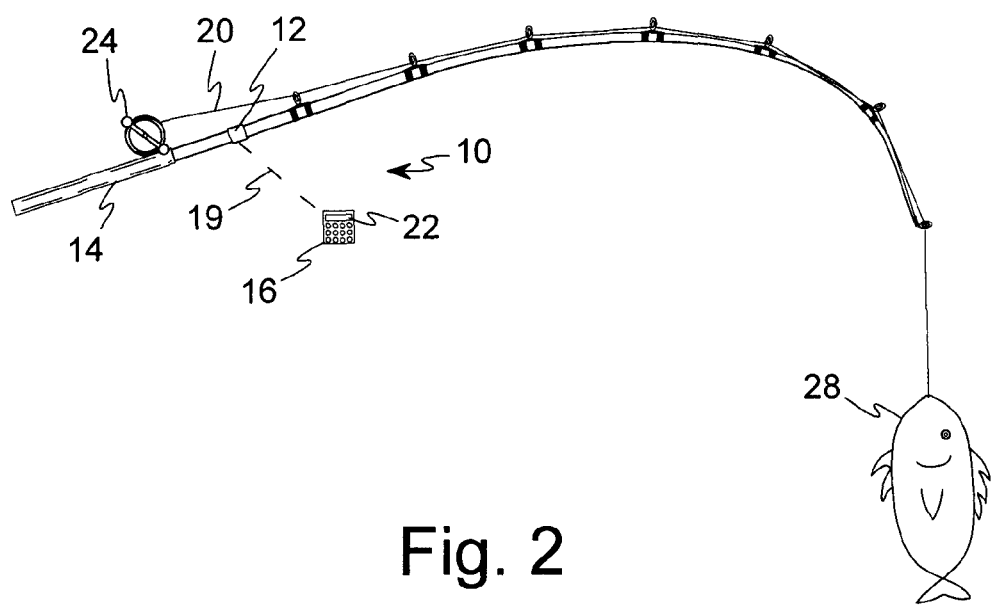
FIG. 2 is a perspective view showing the sensing device on a fishing rod with line tension applied.

The strain gauge 12 has the ability to sense and measure the flex of the fishing rod 14. When a fish or other means applies tension to the fishing line 20, the fishing rod 14 will flex as illustrated by way of example in FIG. 2. When greater tension is placed on the fishing line 20, the fishing rod will flex even more. When less tension is applied to the fishing line 20, the fishing rod will flex less.

The rod 14 can be substantially any longitudinally elongated fishing rod, as the strain gauge 12 requires no special grooves, compartments, or intrusions on the rod structure. Because a major purpose of the sensing device 10 is to determine line tension, the rod 14 should carry a reel with fishing line. The fishing line is strung through the rod in conventional fashion, generally parallel to the longitudinal dimension of the rod, usually through eyelets. The reel and fishing line are mounted on the rod such that the rod flexes when pulling force is applied to the fishing line from an angle out of alignment with the longitudinal dimension of the rod, as suggested in FIG. 2.

The strain gauge senses the degree of flex of the fishing rod and generates an output signal indicative of the sensed degree of flex, such as by a signal that is proportionate to the sensed degree of flex. In any event, the output signal consists of data reflecting the flex of the fishing rod. The data is transmitted to the microprocessor in electronics package 16, where the microprocessor uses the data to determine line tension. The electronics package or microprocessor are in communication with the strain gauge to receive an input signal responsive to the output signal from the strain gauge. The input signal may be the same output signal sent by the strain gauge, but the input signal typically will be a modified or conditioned signal. The microprocessor is a commercially available component separate from the strain gauge 12. A suitable microprocessor is a Microchip Technology brand PIC16F914.

Typically, the signal from the strain gauge 12 is sent to a signal conditioning circuit that is mounted on the printed circuit board (PCB) with the microprocessor. A suitable signal conditioning circuit may amplify the signal, using an amplifier such as a Linear brand LT1789-1 single chip instrumentation amplifier. The output of the signal conditioning circuit is sent to the microprocessor.

The microprocessor is programmed to receive the conditioned input signal, to processes the input signal by performing programmed steps to determine tension on the fishing line, and to produce a corresponding readout signal of tension on the fishing line in a selected unit of measurement. Suitable software steps are programmed into the microprocessor, or otherwise communicated to the microprocessor, to determine line tension. The microprocessor converts or processes the input signal into a readout signal that is expressed in selected units of force. Typically, the readout signal is expressed in pounds.

An output device such as LCD display 22 is in communication with the microprocessor to receive the readout signal. The output device expresses the tension on the fishing line in the selected unit of measurement. The output may be in any humanly perceptible form. Either audio or video devices are suitable. LCD display 22 can express the tension reading as a digital number. It is not necessary that the digital display express the unit of measurement, as this is likely to be constant and to be an assumed element of the readout.

The electronics package 16 of the sensing device has the means for calibration employing code suitable to cause it to digitally display the actual amount of fishing line tension expressed in suitable units, such as in pounds of force. The electronics package 16 electronically calculates the force based on the amount of flex that the sensing device 12 senses in the fishing rod 14. As described, fishing line tension causes the flex, which the strain gauge 12 detects and electrically transmits to the electronics package 16. There, the flex is converted into pounds of force and displayed in LCD format.

No two fishing rods flex exactly the same. After the electronic sensor 12 is installed on a preselected fishing rod 14, the electronics package 16 and strain gauge are calibrated to indicate accurately the fishing line pressure for the particular fishing rod 14 being used. Software developed as a part of the invention accomplishes the calibration. The ability to calibrate the sensing device 12 for the individual characteristics of a particular fishing rod 14 significantly improves the performance of each application.

The angler should perform calibration based on how many pounds of tension is desired on the fishing line before the drag from the fishing reel 24 will allow the fishing line 20 to unspool. This is commonly known as "drag setting." The calibration is performed by interface between the fisherman and the electronics package 16, where software and settings may be recorded in the microprocessor or related memory. The interface consists of the digital display 22 and a keyboard 26, which may include hard keys, soft keys, or a combination of both. Hard keys are buttons on a fixed or permanent keypad. Soft keys are buttons that are defined on a touch screen. The keypad illustrated in FIG. 1 is composed of an array of buttons, which may include a number keypad and such additional buttons as are desired. As examples, one additional key might be the "on" or "calibrate" key. Another might be the "enter" key. Still another might be the "off" key. These keys of these examples can be varied, combined, substituted, or eliminated according to specific needs of the software.

Figure 3:
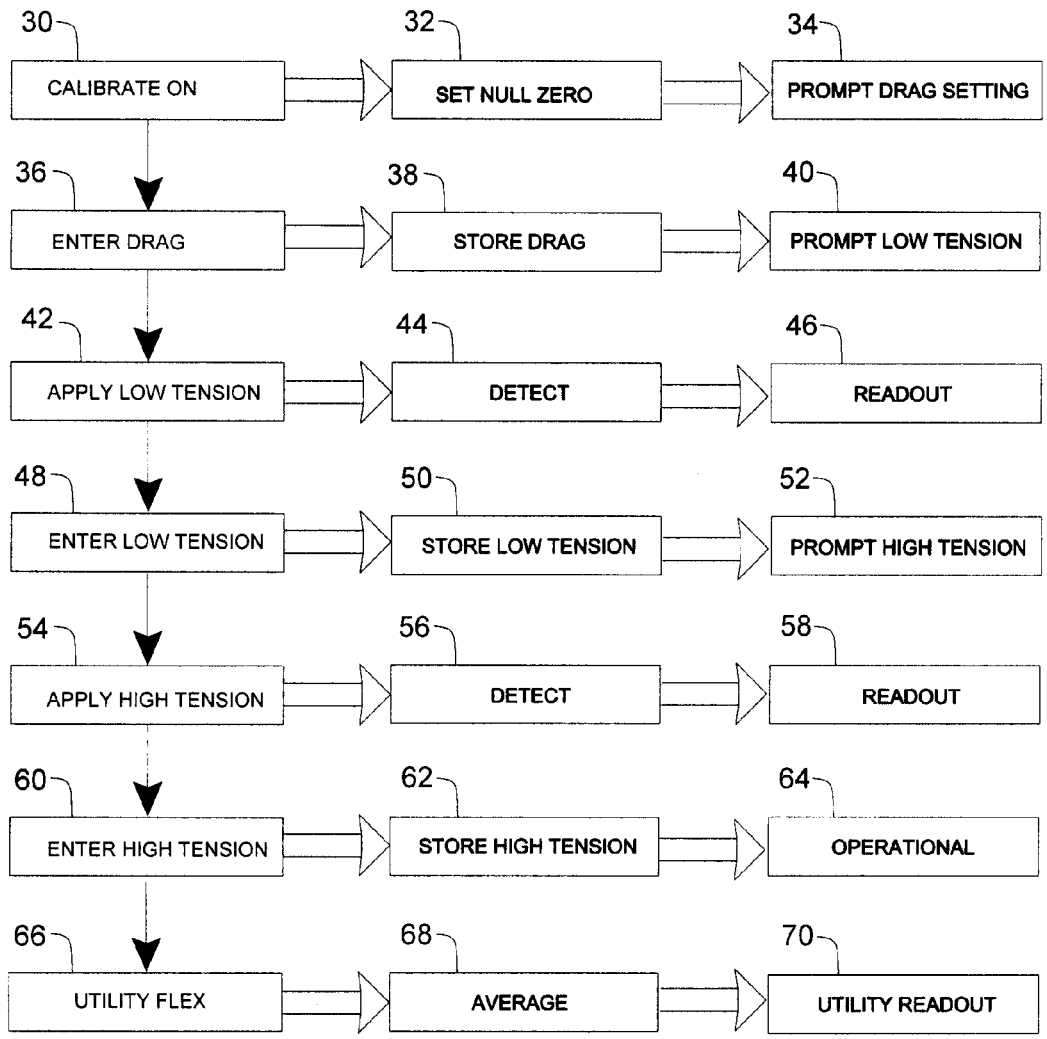
FIG. 3 is a schematic view of the sensing device in operation, showing human interface actions at the left column, showing sensor logic operations in the middle column, and showing display operations in the right column.

With reference to FIG. 3, a preliminary portion of the calibration process takes place with substantially no line tension. For example, the fisherman may hold the rod in horizontal position with the fishing line hanging free. The line applies no substantial pressure on the preselected rod 14. Thus, the strain gauge reads the flex of the preselected rod at approximately zero flex and zero line tension.

The sensor device 10 is operated in calibration mode by programming the microprocessor to request benchmark values of line tension based on a target value. The microprocessor is programmed to receive and record inputs of rod flex associated with benchmark values of line tension. The microprocessor is also programmed to operate in utility mode by receiving an input of rod flex and by automatically outputting an associated line tension by derivation from the recorded benchmark values.

In general operation of calibration mode, the user triggers calibration mode and then inputs a target value for line drag to the microprocessor. In response, the microprocessor sends to the user a programmed request for the fishing rod to be flexed to a first degree, to produce an associated first benchmark of line tension readout that is lower than the target value for line drag. The user flexes the preselected fishing rod to the first degree. The user then inputs the resulting first benchmark value for line tension readout to the microprocessor. The associated first strain gauge output signal is already available to the microprocessor and can be recorded in association with the first benchmark for line tension readout.

The microprocessor also sends to the user a programmed request for the fishing rod to be flexed to a second degree, to produce an associated second benchmark for line tension readout that is higher than the target value for line drag. The user flexes the preselected fishing rod to the second degree and inputs the second benchmark value for line tension readout to the microprocessor. The associated second strain gauge output signal is already available to the microprocessor and can be recorded in association with the second benchmark for line tension readout.

In general operation of utility mode, the sensor device 10 operates according to its operational programming by receiving an input of rod flex and by automatically outputting an associated line tension by derivation from the recorded benchmark values. The user merely fishes, with the result that when a fish is caught, the rod flexes to an unknown degree. The sensor device presents the derived values on the output device, allowing the user to compensate for unacceptable line tension readouts by controls on the reel.

More specifically, FIG. 3 shows human interface actions at the left column, sensor logic actions at the center column, and display actions at the right column. In this initial stage, it is desirable to record in memory the output from the strain gauge when the rod is substantially non-flexed. This setting zeros the strain gauge and electronics package, establishing a zero base for later readings and eliminating possible errors in the performance of the particular strain gauge and the particular electronics package.

To establish zero reading, the angler will first push a control button at 30 triggering the sensor device to enter into calibration mode, and thereby setting sensor logic at 32 to recognize a "Null Zero" point on the digital display of the electronics package. Once the sensor 10 is in calibration mode, the digital display of the electronics package will show a prompt at 34 for the angler to enter at 36 the selected, desired fishing reel drag setting. This desired drag setting may be selected according to the manufacturer's recommendation for the fishing line in use. The angler enters the desired fishing reel drag setting at 36 into the electronics package, which receives and stores the desired setting at 38. The sensor logic employs this desired setting as the target setting when prompting for additional inputs.

Next, the display shows a prompt at 40 to apply a low-end "pounds of force" tension to the fishing line. The angler applies low tension at 42 by causing pulling on the line sufficiently for the fishing rod to flex slightly, to produce a prompted-for line drag reading. The strain gauge detects the low-tension flex at 44 and sends a signal that results in line tension readout at 46. This low-end line tension readout will be lower than the desired fishing reel drag setting. The angler will enter the displayed low tension data into the sensor system 10 by pushing "enter" at 48 on the electronics package 16, which stores the low flex output signal level and low line tension readout at 50. This low tension setting in memory is a function of the reading taken by the strain gauge at the associated low degree of flex. Thus, the microprocessor has available a known signal level from the strain gauge at a known line drag readout that is below the desired drag limit.

Next, in response to having stored the low-tension reading, the digital display of the electronics package shows a prompt at 52 to apply a high foot-pound "pounds of force" tension to the fishing line. The angler at 54 applies higher tension to the fishing line, which causes the fishing rod to flex by a greater amount. This high line tension will be higher than the desired fishing reel drag setting. The strain gauge detects the greater flex associated with the higher tension at 56 and outputs a corresponding signal. The microprocessor calculates a corresponding higher readout of line tension at 58. The angler will store the data associated with this high setting at 60 by pushing "enter" on the electronics package, which stores the high tension setting at 62. This high tension setting in memory is a function of the output signal from the strain gauge at the associated high degree of flex. Thus, the microprocessor has available a known signal level from the strain gauge at a known line drag readout that is above the desired drag limit.

Calibration of the sensor is now complete, causing the calibrated sensor to enter operating mode. The sensor takes utility readings at 64, where the readout is now accurate for line tension and associated flex in use at 66. According to software control, and based on the amount of fishing rod flex at the remembered high fishing line tension and low fishing line tension settings, the electronics package can mathematically average, proportion, or interpolate at 68 the operational or utility fishing rod flex into a line tension readout for other amounts of pressure applied to the fishing line. At all times, the digital display at 70 will show how much tension is being placed on the fishing line based on the amount of associated flex measured in the preselected fishing rod.

Changing the reel or changing to a fishing line of different pound test value will have little or no effect on the electronics package, and it will continue to display accurate readings at 70 with respect to the preselected fishing rod. If an angler decides to change a desired fishing reel drag setting by more to than 25%, it is advisable to recalibrate the electronics package in order to maintain accuracy. Recalibration is accomplished by duplicating the steps 30-62 described above.

The calibration enables the sensing device to determine how much tension or pressure is on the fishing line and to display this result at 70 in appropriate units, such as in pounds of force. The sensing device digitally displays this result in pounds force as a result of calibration, which converts foot-pounds into pounds force. With this information available, the angler will be able to monitor and adjust the fishing reel drag to the desired foot pound tension as suggested by the fishing line manufacturer, by employing the drag adjustment means provided on common fishing reels. When the fisherman adjusts the fishing reel drag, the digital read out of the electronics package instantaneously indicates the new tension in foot-pounds. All common fishing lines have a manufacturer's pound test rating, which the fisherman can use at 36 to select a desired fishing reel drag according to operational readout at 70.

As an example, a sensing device 10 may employ a strain gauge 12 of the type known as a foil strain gauge with ability to read in more than one axis. This choice enables the strain gauge to be mounted either on top or bottom of the fishing rod. Mounting with slightly less than perfect alignment does not adversely affect performance. The ability to perform with less than perfect alignment is enabled by employing a strain gauge that reads on more than one axis, coupled with the described calibration technique.

The calibration technique employs averaging or any other suitable proportioning technique for determining a reading between known upper and lower readings. A desired drag is selected, after which the sensing device displays a greater tension, which is entered, and a lesser tension, which is entered. The desired tension is centered between the high and low tension settings. As a further example, if ten pounds is the desired drag, the sensing device might ask for eight and twelve pounds for respective low and high. A tightly defined range between the low and high settings achieves the greatest accuracy. Testing various rods has shown a flex curve that is almost a straight line, which aids the accuracy of the calibration technique.

In addition, it is desirable to use balanced tackle. Fishing rods often have a manufacturer's recommended pound test line for use on the rod. Staying within the rod manufacturer's recommendations aids sensor accuracy. If overly heavy line is used and, resultantly, the fisherman applies more pressure than the rated amount for the rod, the rod can react by what is known as "bottoming out." At this point, the rod may not flex any further and could break. If light line is used on a rod rated for heavy line, the rod will be too stiff for the light line and will not flex properly at correspondingly light pressures. Thus, the use of balanced tackle, wherein the rod, reel and line all have similar manufacturer's rating or recommendations, is beneficial to achieving accuracy.

A proposed mechanism of operation for the sensing device and method is that a force on the fishing line creates a bending torque on the rod. The downward bend of the rod is more or less proportional to the angle and force of the line. As the rod bends, the outside edge of the rod is in compression on the bottom surface and in tension on the top surface. The strain gauge 12 measures resistance that is proportional to the amount of compression/tension, which is proportional to force on the line. The signal conditioning circuit on the PCB converts the resistance of the strain gauge to a voltage that is presented to the microprocessor. This voltage is similarly proportional to the force on the fishing line. The microprocessor converts the voltage to a number and then uses several constants, which are determined during the calibration process, to calculate the force on the line in lbs. The calculated value is then displayed on the LCD.

It is the desire of most fishermen to put the maximum pressure or braking force, commonly known as drag on the fishing line 20, as is possible while a fish 28 is on the fishing line without having it break or part the fishing line. Most common fishing line is pound test rated, such that the fishing line will most likely break if the pound test rating is exceeded with more tension. Maximum fishing line tension without breaking the fishing line enables the fisherman to land a fish in a minimum amount of time. The longer a fish is on the fishing line, the higher the odds that the fish will be lost.

Time works against a fisherman's chance of success in landing a fish. A few of the endless reasons that can contribute to losing a fish are: (a) the fish may inadvertently come unhooked from the fishing line; (b) with time the fishing line may fatigue and break because it can no longer withstand forces applied at it's pound test rating; (c) the fishing line may rub against a foreign underwater object and abrade to cause weakness to the point that it breaks; (d) the struggling fish may even be eaten by a shark; or (e) the point of attachment to the fish gets worn and the fish simply comes unhooked.

Measuring fishing line tension or "drag" has always been a subjective deduction by a fisherman. Most often a fisherman pulls on the line by hand and adjusts the drag or braking force on the fishing reel based on what the pull "feels" like. Many fish are lost because the fisherman adjusts fishing reel drag at a drag setting beyond the rated test of the fishing line. While a fish is pulling on the fishing line, it is difficult to determine or accurately gauge how much tension is on the line. The sensing device and method will enable anglers to determine how much line tension or reel braking pressure, commonly known as drag, is applied to the fishing line. This determination is accurate in real time. The angler will know the drag pressure by observing the electronic digital LCD 22 read out on the sensing device anytime tension is exerted on the deployed fishing line. Instead of relying on "feel" to determined tension, the angler will see the amount of tension displayed on the electronic digital LCD display. As a result, the fisherman can accurately adjust the fishing reel drag to a real time pressure equal to or less than the pound test rating of the fishing line. This adjustment is made by means of a lever or other control that commonly is present on a fishing reel to adjust drag.

The marine environment where a fishing rod and a fishing reel are used is very harsh due to salt, dirt, other foreign matter, corrosion, and the like. If a fishing rod and fishing reel are not cleaned and lubricated after use, they will deteriorate and cease to function properly. The sensing device of this invention has no moving parts that could be affected by such a harsh environment. Because the sensing device has no moving parts and requires no routine maintenance, the sensing device is reliable in long term operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. The combination of a fishing line drag sensor and a fishing rod, wherein the sensor is fixed onto the fishing rod independently of the fisherman's grip or of a reel carried on the rod, to derive fishing line tension and display the tension in real time while the fishing line is deployed, as a function of the fishing rod's flex characteristics and characteristics of the fishing line regardless of grip, comprising:

a longitudinally elongated fishing rod having a reel at a proximal end thereof with a fishing line mounted thereon, wherein said rod is of sufficient length that a distal portion thereof is, in use while fishing, beyond a the reasonably grippable porton of the length, and wherein said rod is of a known design that flexes when pulling force is applied to said fishing line from an angle out of alignment with the longitudinal dimension of the rod;

a strain gauge directly bonded to said fishing rod on said distal portion thereof that is, in use while fishing, beyond a reasonably grippable portion of the length, wherein the strain gauge is suitably mounted to sense the degree of flex of the fishing rod and to generate an output signal as a function of the sensed degree of flex without regard to grip, containing data indicative of the sensed degree of flex, and wherein said strain gauge has ability to read on more than one axis, permitting performance with a mounting having less than perfect alignment with the length of the fishing rod;

a microprocessor that is in communication with the strain gauge to receive said output signal from the strain gauge, wherein said microprocessor contains programmed instructions for processing said input signal to convert said data indicative of sensed degree of flex into line tension on the fishing line and for producing a corresponding readout signal of line tension on the fishing line in a selected unit of measurement; and a data display device that is in communication with the microprocessor to receive said readout signal of line tension and to display the line tension in humanly perceptible form and in the selected unit of measurement;

wherein the microprocessor is programmed to be calibrated as a function of characteristics of the fishing rod and fishing line without regard to grip, to determine utility line drag with respect to the fishing rod and the fishing line for which a drag setting is selected, by the steps comprising:

inputting said selected line drag;

flexing the fishing rod to a first degree by pulling on the fishing line to produce a respectively lower line drag readout than the selected line drag at said output device;

inputting said lower readout and strain gauge output at said first degree of flex;

flexing the fishing rod to a second degree by pulling on the fishing line to produce a respectively higher line drag readout than the selected line drag at the output device; and inputting said higher readout and strain gauge output at said second degree of flex;

whereby in use when the fishing rod is utilized by pulling on the fishing line to produce an unknown flex, the microprocessor is enabled to respond by determining a readout value of line drag at said unknown flex by proportioning with known readout values for said first and second degrees of flex.

2. The apparatus of claim 1, further comprising:

a waterproof housing containing said microprocessor and output device, located remotely from said strain gauge.

3. The apparatus of claim 2, wherein said microprocessor is in communication with the strain gauge by wireless communication.

4. The apparatus of claim 1, wherein said steps further comprise:

inputting strain gauge output at substantially zero line tension and thereby determining a zero flex signal;

inputting said zero flex signal as associated with zero readout of line tension.

\* \* \* \* \*